United States Patent
Liang et al.

(10) Patent No.: US 9,920,922 B2
(45) Date of Patent: Mar. 20, 2018

(54) AUTOMATIC LIGHT INTENSITY COMPENSATING DEVICE OF SURGICAL LIGHT

(71) Applicant: Amtai Medical Equipment, Inc., Raleigh, NC (US)

(72) Inventors: Clay Liang, Raleigh, NC (US); Wei-Li Wu, Taichung (TW); Chih-Cheng Tseng, Taoyuan (TW)

(73) Assignee: AMTAI MEDICAL EQUIPMENT, INC., Raleigh, NC (US)

( * ) Notice: Subject to any disclaimer, the term of this patent is extended or adjusted under 35 U.S.C. 154(b) by 129 days.

(21) Appl. No.: 15/058,162

(22) Filed: Mar. 2, 2016

(65) Prior Publication Data

US 2017/0254527 A1 Sep. 7, 2017

(51) Int. Cl.
| | |
|---|---|
| F21V 33/00 | (2006.01) |
| H05B 37/02 | (2006.01) |
| F21V 17/02 | (2006.01) |
| F21V 23/04 | (2006.01) |
| F21W 131/205 | (2006.01) |

(52) U.S. Cl.
CPC .......... *F21V 33/0068* (2013.01); *F21V 17/02* (2013.01); *F21V 23/04* (2013.01); *H05B 37/0227* (2013.01); *F21W 2131/205* (2013.01)

(58) Field of Classification Search
CPC ...... F21V 33/0068; F21V 17/02; F21V 23/04; H05B 37/0227
See application file for complete search history.

(56) References Cited

U.S. PATENT DOCUMENTS

| | | | | |
|---|---|---|---|---|
| 6,402,351 B1* | 6/2002 | Borders | .................... | F21V 7/09 |
| | | | | 362/395 |
| 6,863,422 B2* | 3/2005 | Jesurun | ................. | F21V 21/403 |
| | | | | 362/295 |
| 2007/0041167 A1* | 2/2007 | Nachi | ..................... | F21S 2/005 |
| | | | | 362/33 |
| 2010/0081887 A1* | 4/2010 | Marka | ..................... | F21V 23/04 |
| | | | | 600/249 |
| 2013/0258661 A1* | 10/2013 | Jousse | ................. | F21V 33/0068 |
| | | | | 362/235 |
| 2014/0133144 A1* | 5/2014 | Krijn | ........................ | F21V 3/00 |
| | | | | 362/235 |
| 2017/0130932 A1* | 5/2017 | Longoni | ............ | H05B 33/0845 |

* cited by examiner

*Primary Examiner* — Jong-Suk (James) Lee
*Assistant Examiner* — Christopher R Dunay
(74) *Attorney, Agent, or Firm* — Leong C. Lei

(57) ABSTRACT

An automatic light intensity compensating device of a surgical light includes a suspension or support system and one or multiple light heads carried on the suspension or support system. Each of the light head includes a housing, one or multiple grips mounted to the housing for hand holding and moving the light head to a desired position, one or multiple light sources mounted in the housing for illumination, a focus adjustment mechanism for adjusting the focal length of illumination, a focusing detection mechanism for detecting a position of the focus adjustment mechanism within a variation range, and an automatic illuminance compensation device, which automatically increases or decreases luminance of the light source according to the position of the focus adjustment mechanism.

2 Claims, 7 Drawing Sheets

| segment \ site | A | B | C |
|---|---|---|---|
| 1 | 1 | 1 | 1 |
| 2 | 0 | 1 | 1 |
| 3 | 0 | 1 | 0 |
| 4 | 1 | 1 | 0 |
| 5 | 1 | 0 | 0 |
| 6 | 0 | 0 | 0 |
| 7 | 0 | 0 | 1 |
| 8 | 1 | 0 | 1 |

Sensor blocked = 1

Sensor unblocked = 0

FIG. 6

AUTOMATIC LIGHT INTENSITY COMPENSATING DEVICE OF SURGICAL LIGHT

TECHNICAL FIELD OF THE INVENTION

The present invention relates generally to an automatic light intensity compensating device of a surgical light, and more particularly to controls related to lighting of light sources of surgical lights.

DESCRIPTION OF THE PRIOR ART

A conventional surgical light is allowed to adjust the focal length of illumination by varying the relative position between a light source of a light head and a reflector, or by simultaneously varying the angles of multiple light heads.

When the focusing of lighting of a surgical light varies, the diameter of an illumination range of a light head may be changed on a focal plane, or the distance between a focal plane and a light head is changed. Since illuminance is inversely proportional to the diameter of the illumination range and the square of the illumination distance, when the diameter of the illumination range is increased or the focal plane is moved away, the illuminance of a surgical light on an operation area may be significantly reduced.

Taking the variation of the focal length of illumination of a surgical light disclosed in US Patent Application Publication Nos. 2002/0145885 and 2005/0052875 as an example, only the diameter of a reflector of a light head can be increased in an illumination range, or the same amount of light energy can be intercepted when the focal plane is moved away; however, the illuminance of the surgical light on an operation area cannot be increased, making the use and operation inconvenient.

SUMMARY OF THE INVENTION

The primary object of the present invention is to use a focus adjustment mechanism to set focus of light of each light source and a focus detecting device detecting a focus range so set so that when a variation of an illumination range occurs, focus of light and luminance of each light source can be automatically adjusted to provide an effect of automatic detection and automatic illuminance strengthening.

To achieve the above object, the present invention provides an automatic light intensity compensating device of a surgical light, which comprises: a suspension or support system; and one or multiple light heads carried on the suspension or support system, wherein each of the light heads comprises a housing, one or multiple grips mounted to the housing for hand holding and moving the light head to a desired position, one or multiple light sources mounted in the housing for illumination, a focus adjustment mechanism for adjusting the focal length of illumination, a focusing detection mechanism for detecting a position of the focus adjustment mechanism within a variation range, and an automatic illuminance compensation means, which automatically increases or decreases luminance of the light source according to the position of the focus adjustment mechanism.

In an embodiment of the present invention, an operation interface is also included for activating or deactivating the automatic illuminance compensation means.

In an embodiment of the present invention, the operation interface comprises an indicator mounted thereto to indicate a status of activation or deactivation of the automatic illuminance compensation means.

In an embodiment of the present invention, the focus adjustment mechanism is operated by rotating the grip mounted to the light head.

In an embodiment of the present invention, the focus detecting device comprises a coding ring that is set at a position that is invariable with respect to the housing and a plurality of detection elements mounted to the grip to respectively detect segments of the coding ring so that through the rotation of the grip, the focus detecting device detects the segment position where the focus adjustment mechanism is set.

In an embodiment of the present invention, through the rotation of the grip, the focus detecting device drives a shaft of a potentiometer to detect the position of the focus adjustment mechanism.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 6 illustrates coding of the focus detecting device of the first embodiment the present invention.

DETAILED DESCRIPTION OF THE PREFERRED EMBODIMENTS

Figure 1:
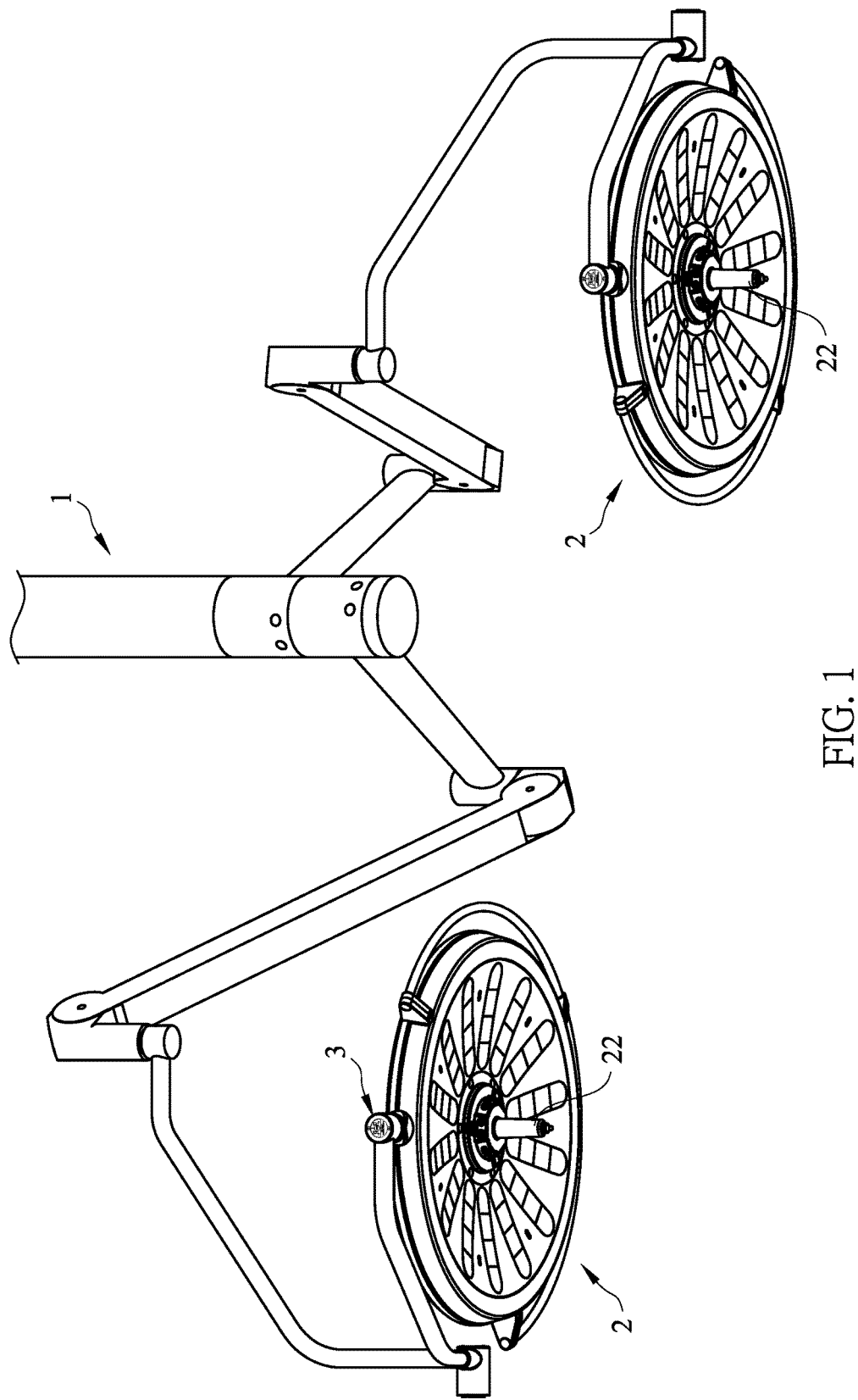
FIG. 1 is a schematic view illustrating an entire arrangement of the present invention.
Figure 2:
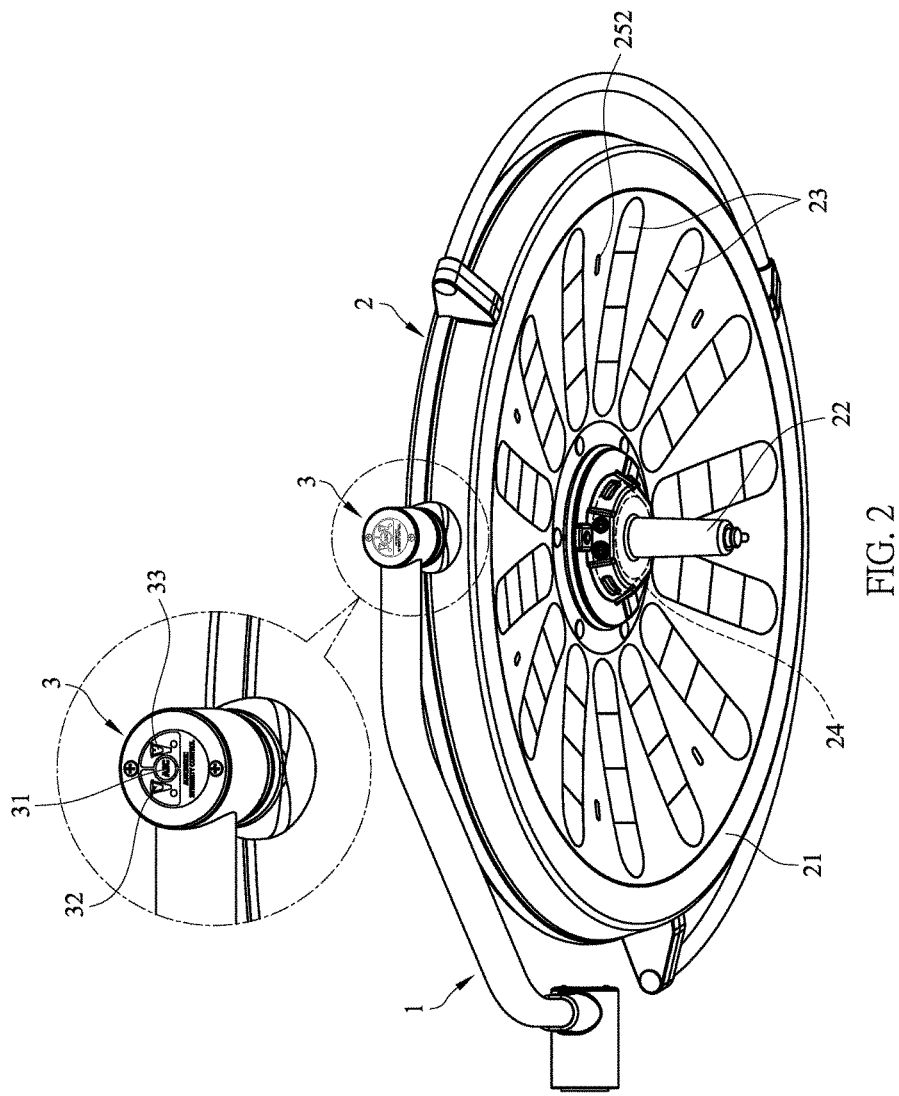
FIG. 2 is a perspective view showing a light head of the arrangement of the present invention.
Figure 3:
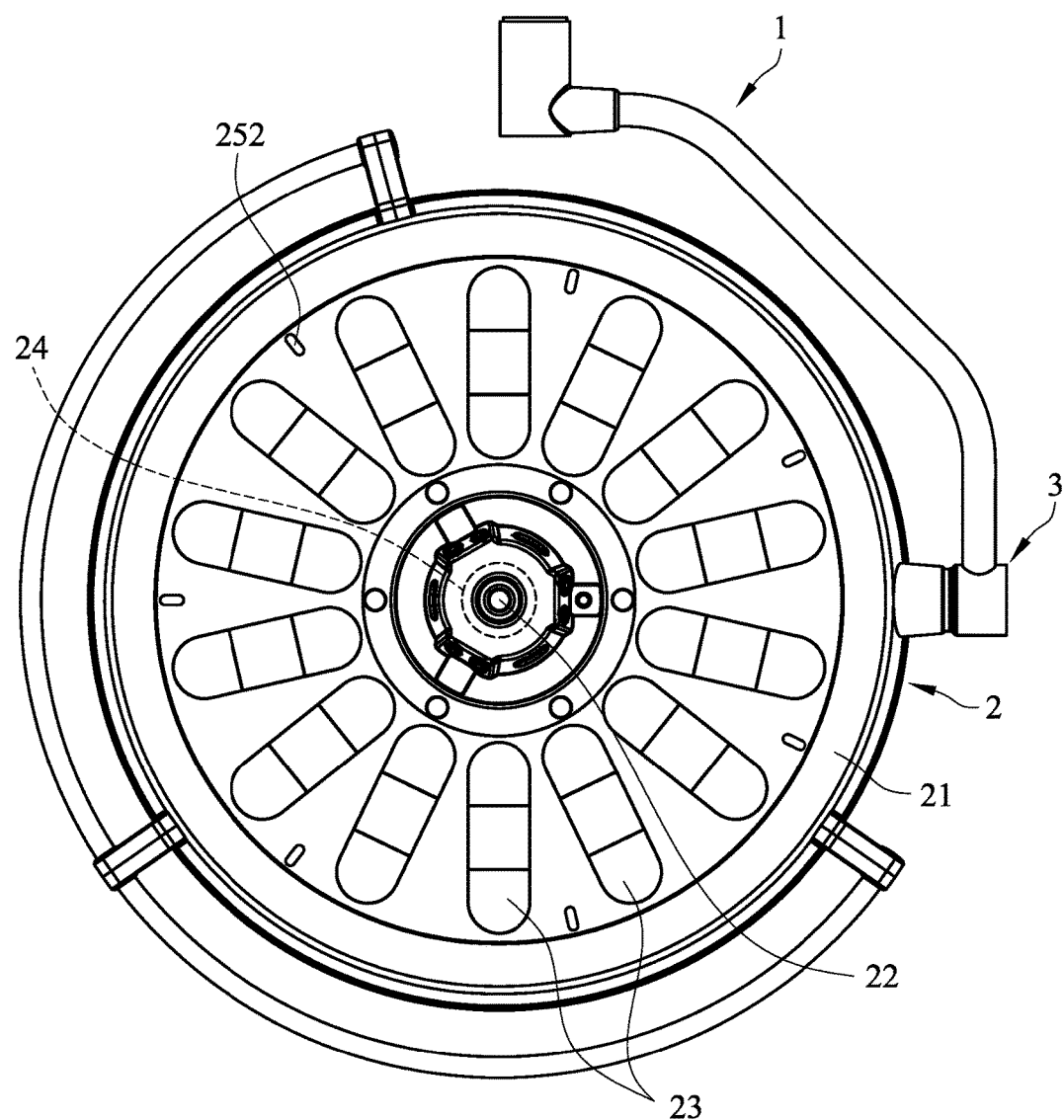
FIG. 3 is a bottom view of the light head of the arrangement of the present invention.
Figure 4:
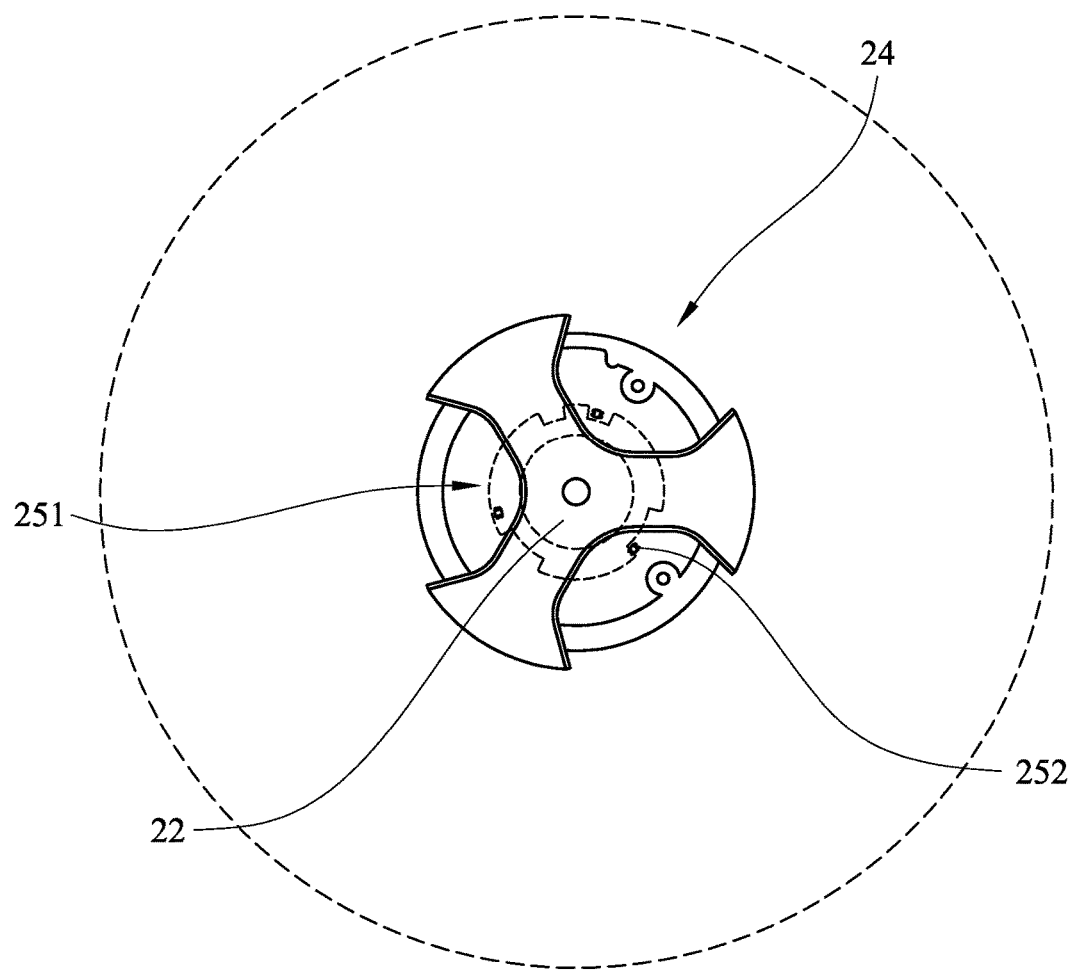
FIG. 4 is a bottom view illustrating a focus adjustment mechanism according to a first embodiment of the present invention.
Figure 5:
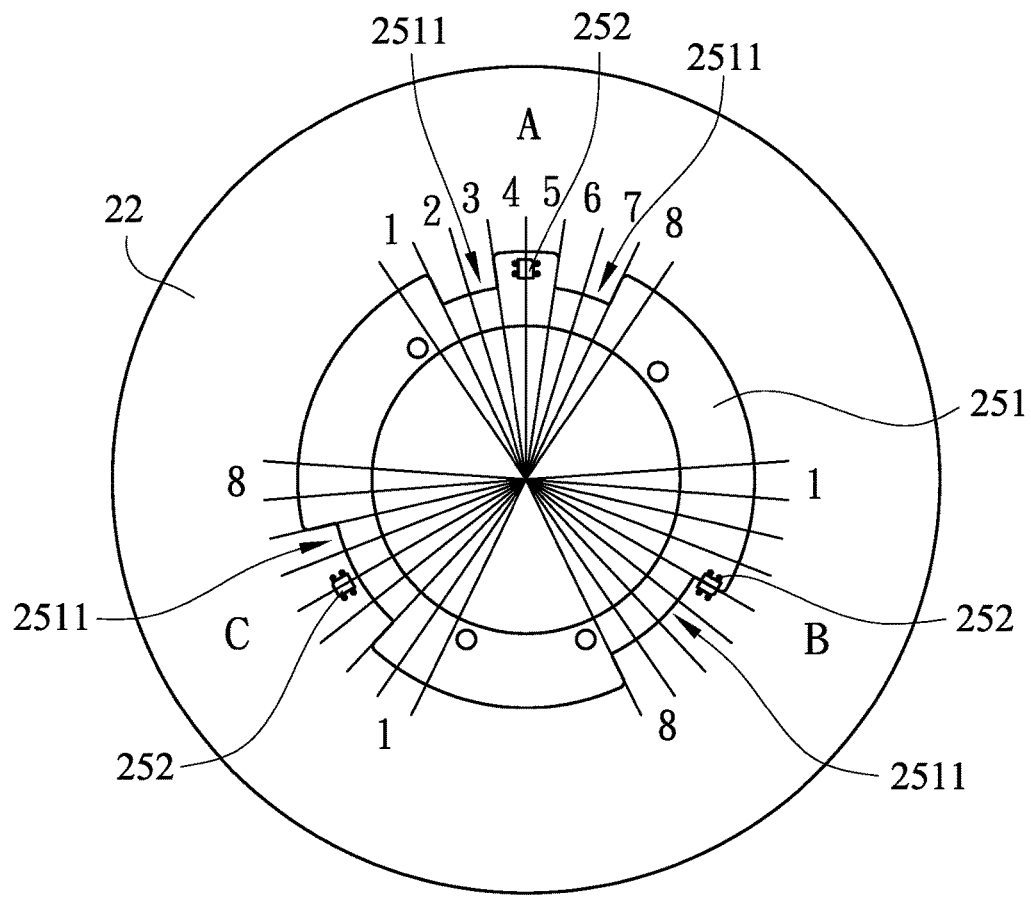
FIG. 5 is a schematic view illustrating segments of a focus detecting device according to the first embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 3, 4, 5, and 6, which are respectively a schematic view illustrating an entire arrangement of the present invention, a perspective view showing a light head of the arrangement of the present invention, a bottom view of the light head of the arrangement of the present invention, a bottom view illustrating a focus adjustment mechanism according to a first embodiment of the present invention, a schematic view illustrating segments of a focus detecting device according to the first embodiment of the present invention, and coding of the focus detecting device of the first embodiment the present invention. As shown in the drawings, the present invention provides an automatic light intensity compensating device of a surgical light, which comprises at least a suspension or support system 1 and one or multiple light heads 2 carried on the suspension or support system 1.

The light head 2 comprises a housing 21, one or multiple grips 22 mounted to the housing 21 for hand holding and moving the light head 2 to a desired location, one or multiple light sources 23 mounted inside the housing 21 for illumination, a focus adjustment mechanism 24 for adjusting the focal length of illumination, a focus detecting device 25 for detecting a position of the focus adjustment mechanism 24 within a variation range, and an automatic illuminance compensation means, which automatically increases or decreases luminance of the light source 23 according to the position of the focus adjustment mechanism 24. Also included is an operation interface 3, on which a switch 31 is mounted for activating or deactivating the automatic illuminance compensation means. The operation interface 3 is provided with indicators 32, 33 for indicating the status of activation or deactivation of the automatic illuminance compensation means.

To put the present invention into operation, the focus adjustment mechanism 24 is operated with the grip 22 mounted to the light head 2. The focus detecting device 25 comprises a coding ring 251 that is set at a position that is invariable with respect to the housing 21 and a plurality of detection elements 252 mounted to the grip 22 to respectively detect segments of the coding ring 251. The coding ring 251 is provided with a plurality of notches 2511, so that when the grip 22 is rotated, the positions of different notches 2511 block (or unblock) the detection elements 252, wherein a signal of each of the detection elements 252 is "1" when block and is "0" when not blocked. For example, if the grip 22 is rotated to a position of segment 1, the detection elements 252 at three sites A, B, and C are all in a blocked state; if the grip 22 is rotated to a position of segment 2, the detection element 252 at site A is in an unblocked state and the detection elements 252 at sites B and C are in a blocked state; if the grip 22 is rotated to a position of segment 3, the detection elements 252 at sites A and C are in an unblocked state and the detection element 252 at site B is in a blocked state; if the grip 22 is rotated to a position of segment 4, the detection elements 252 at sites A and B are in a blocked state and the detection element 252 at site C is in an unblocked state; if the grip 22 is rotated to a position of segment 5, the detection element 252 at site A is in a blocked state and the detection elements 252 at sites B and C are in an unblocked state; if the grip 22 is rotated to a position of segment 6, the detection elements 252 at the three sites A, B, and C are all in an unblocked state; if the grip 22 is rotated to a position of segment 7, the detection elements 252 at sites A and B are in an unblocked state and the detection element 252 at site C is in a blocked state; if the grip 22 is rotated to a position of segment 8, the detection elements 252 at sites A and C are in a blocked state and the detection element 252 at site B is in an unblocked state (as shown in FIG. 6). In this way, rotating the grip 22 may make the position of segment where the focus adjustment mechanism 24 is on detected, whereby the focus adjustment mechanism 24 may be used to set a focus range of light.

When light emits from the light source 22, the focus detecting device 25 detects the set focus range of light, so that when the focus detecting device 25 detects a variation of the diameter of an illumination range of each of the light sources 22, or a variation of the relative distance between focus planes of each of the light sources 22, the automatic illuminance compensation means is operated to automatically increase or decrease the luminance of the light source 23.

Figure 7:
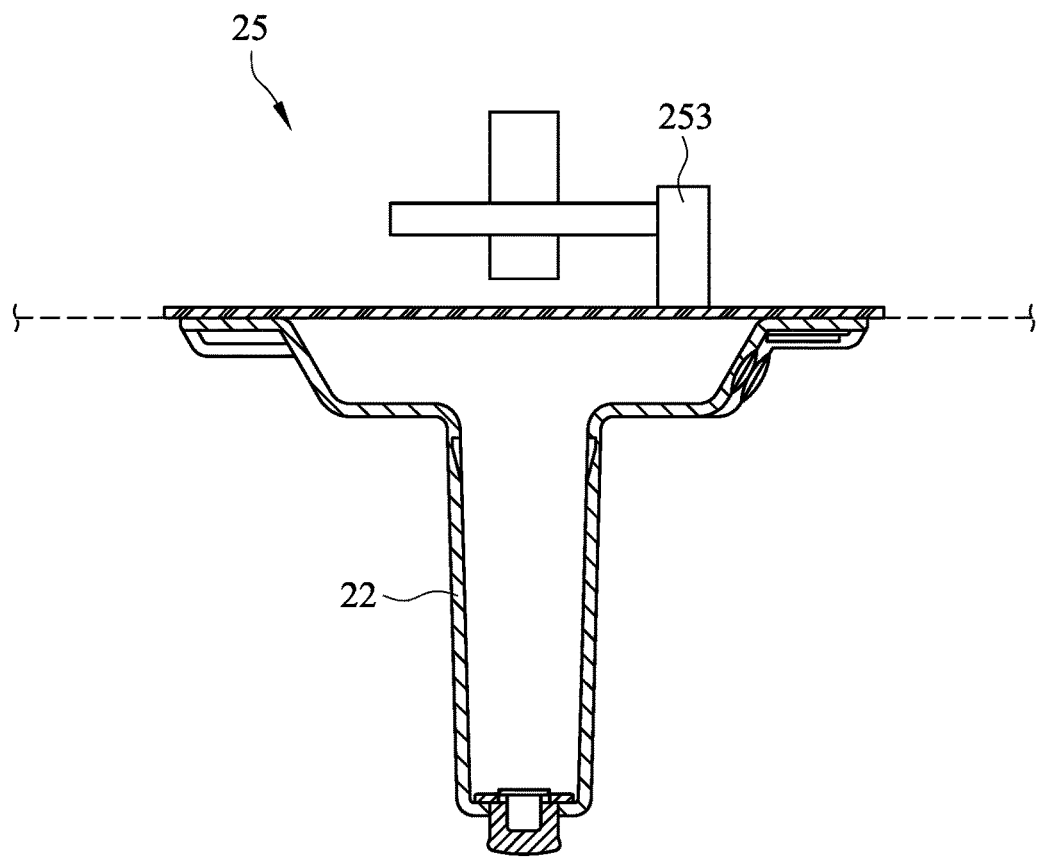
FIG. 7 is a cross-sectional view illustrating a focus detecting device according to a second embodiment of the present invention.

Further referring to FIG. 7, which is a cross-sectional view illustrating a focus detecting device according to a second embodiment of the present invention, as shown in the drawing, in addition to the structure illustrated above as the first embodiment, the focus detecting device 25 of the present invention may also have a structure as a second embodiment, the difference being that the focus detecting device 25 is rotated by means of the grip 22 to drive a shaft of a potentiometer 253 in order to detect the location of the focus adjustment mechanism 24.

In summary, the present invention provides an automatic light intensity compensating device of a surgical light, which effectively improve the shortcomings of the prior art, wherein a focus adjustment mechanism is provided for setting the light focal length of each light source and a focus detecting device is provided to detect the set focus range so that when a variation of an illumination range occurs, the focus length of light and the illuminance of each of the light sources can be automatically adjusted to achieve an effect of automatic detection and automatic illuminance strengthening.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A surgical light, comprising:
a suspension or support system; and
one or multiple light heads carried on the suspension or support system, wherein each of the light head comprises a housing, one or multiple grips mounted to the housing for hand holding and moving the light head to a desired location, one or multiple light sources mounted in the housing for illumination, a focus adjustment mechanism for adjusting the focal length of illumination, a focusing detection mechanism for detecting a position of the focus adjustment mechanism within a variation range, and an automatic illuminance compensation means, which automatically increases or decreases luminance of the light source according to the position of the focus adjustment mechanism; and
an operation interface for activating or deactivating the automatic illuminance compensation means;
wherein the operation interface comprises an indicator mounted thereto to indicate a status of activation or deactivation of the automatic illuminance compensation means, the focus adjustment mechanism is operated by rotating the grip mounted to the light head, and the focus detecting device comprises a coding ring that is set at a position that is invariable with respect to the housing and a plurality of detection elements mounted to the grip to respectively detect segments of the coding ring so that through the rotation of the grip, the focus detecting device detects the segment position where the focus adjustment mechanism is set.

2. The surgical light according to claim 1,
wherein through the rotation of the grip, a focus detecting device drives a shaft of a potentiometer to detect the position of the focus adjustment mechanism.

* * * * *